United States Patent [19]

Matson et al.

[11] Patent Number: 4,824,443
[45] Date of Patent: * Apr. 25, 1989

[54] GAS SEPARATION BY COMPOSITE SOLVENT-SWOLLEN MEMBRANES

[75] Inventors: Stephen L. Matson, Harvard; Eric K. L. Lee, Acton, both of Mass.; Dwayne T. Friesen; Donald J. Kelly, both of Bend, Oreg.

[73] Assignee: Bend Research, Inc., Bend, Oreg.

[*] Notice: The portion of the term of this patent subsequent to Apr. 12, 2005 has been disclaimed.

[21] Appl. No.: 178,452

[22] Filed: Apr. 7, 1988

Related U.S. Application Data

[63] Continuation-in-part of Ser. No. 947,996, Dec. 30, 1986, Pat. No. 4,737,166.

[51] Int. Cl.$^4$ .............................................. B01D 53/22
[52] U.S. Cl. .......................................... 55/16; 55/68; 55/73; 55/158; 423/219; 423/221; 423/223; 423/229
[58] Field of Search .................. 55/16, 68, 73, 158; 423/219, 221, 223, 226–229, 232, 234, 239

[56] References Cited

U.S. PATENT DOCUMENTS

| | | | |
|---|---|---|---|
| 3,335,545 | 8/1967 | Robb et al. | 55/16 |
| 3,396,510 | 8/1968 | Ward, III et al. | 55/16 |
| 3,447,286 | 6/1969 | Dounoucos | 55/16 |
| 3,503,186 | 3/1970 | Ward, III | 55/16 |
| 3,625,734 | 12/1971 | Ward, III | 55/16 X |
| 3,819,806 | 6/1974 | Ward, III et al. | 55/16 X |
| 3,844,735 | 10/1974 | Steigelmann et al. | 55/16 |
| 3,930,990 | 1/1976 | Brun et al. | 55/16 X |
| 4,015,955 | 4/1977 | Steigelmann et al. | 55/16 |
| 4,115,514 | 9/1978 | Ward, III | 55/16 X |
| 4,119,408 | 10/1978 | Matson | 55/16 X |
| 4,147,754 | 4/1979 | Ward, III | 55/16 X |
| 4,174,374 | 11/1979 | Matson | 55/16 X |
| 4,187,086 | 2/1980 | Walmet et al. | 55/16 |
| 4,444,571 | 4/1984 | Matson | 55/16 |
| 4,542,010 | 9/1985 | Roman et al. | 55/16 X |
| 4,606,740 | 8/1986 | Kulprathipanja | 55/68 X |
| 4,608,060 | 8/1986 | Kulprathipanja et al. | 55/16 |
| 4,609,468 | 9/1986 | Cramm | 55/16 X |
| 4,617,029 | 10/1986 | Pez et al. | 55/16 |
| 4,710,205 | 12/1987 | Deetz et al. | 55/16 X |
| 4,737,166 | 4/1988 | Matson et al. | 55/73 X |
| 4,740,219 | 4/1988 | Kulprathipanja et al. | 55/68 X |

Primary Examiner—Robert Spitzer
Attorney, Agent, or Firm—Chernoff, Vilhauer, McClung & Stenzel

[57] ABSTRACT

There is disclosed a composite immobilized liquid membrane of a solvent-swollen polymer and a microporous organic or inorganic support, the solvent being at least one highly polar solvent containing at least one nitrogen, oxygen, phosphorous or sulfur atom, and having a boiling point of at least 100° C. and a specified solubility parameter. The solvent or solvent mixture is homogeneously distributed through the solvent-swollen polymer from 20% to 95% by weight. The membrane is suitable for acid gas scrubbing and oxygen/nitrogen separation.

43 Claims, 2 Drawing Sheets

GAS SEPARATION BY COMPOSITE SOLVENT-SWOLLEN MEMBRANES

The government has rights in this invention under Department of Energy Contract No. DE-AC03-83ER80035.

This is a continuation-in-part of application Ser. No. 947,996 12-30-86, now U.S. Pat. No. 4,737,166.

BACKGROUND OF THE INVENTION

Removal of the acid gases carbon dioxide and/or hydrogen sulfide from natural gas, petroleum, hydrogen, and coal gas is important from an environmental standpoint since such gases are highly toxic and corrosive, often contributing to the phenomenon known as "acid rain." Such acid gases are also quite destructive to methanation catalysts. Generally, removal is accomplished by a number of scrubbing processes utilizing absorbents or solvents which reversibly absorb the acid gas. For example, the Benfield and Catacarb processes utilize activated carbonate absorbents, the monoethanolamine and diglycolamine processes use aqueous amine solutions, while the Purisol and Sulfinol processes use simple physical solvents. In the case of the Purisol process, the solvent is N-methyl-2-pyrrolidone, and raw gas is contacted with a countercurrent flow of the absorbing solvent, the solvent thereafter being regenerated by flashing and stripping.

However, all such conventional scrubbing processes are quite costly in terms of capital and operating expense since they require absorption in large-volume, high pressure towers, desorption in low pressure generators or stripping columns, extensive pumping for solvent recirculation, and the generation of substantial amounts of steam for stripping. It is estimated that nearly a third of the cost of producing gaseous fuels such as hydrogen and methane from coal is attributable to coal gas cleanup by such processes.

Removal of hydrogen sulfide from coal gas with an immobilized liquid membrane comprising carbonate solution supported in discrete pores of an unspecified microporous hydrophilic polymer membrane was made by Matson et al. and reported in 16 *Ind. Eng. Chem. Proc. Des. Dev.* 370 (1977), the extent of the removal being limited to 15 to 30%. Hydrogen sulfide was also removed from a mixture of hydrogen sulfide and nitrogen by Heyd et al. and reported in 2 *J. Memb. Sci.* 375 (1977), the removal being effected by unsupported vinylidene flouride polymeric membranes modified by the addition of 10% by weight of various amines and other agents. Although the use of 1-methyl-2-pyrrolidone is disclosed as one of the modifiers, the results obtained were ess satisfactory than with an unmodified membrane.

In the production of synthetic natural gas from coal gas (comprising steam, hydrogen, carbon monoxide, carbon dioxide, methane and small amounts of hydrogen sulfide), the concentration of methane is increased in a series of steps which involve the removal of carbon dioxide and hydrogen sulfide since carbon dioxide interferes with the shift conversion reaction step and hydrogen sulfide tends to poison methanation catalysts. In the series of methane-enrichment steps, hydrogen and carbon monoxide are desirably left in the process gas stream since they partake in the shift conversion reaction prior to the methanation reaction. It would therefore be desirable to have a method of efficiently and selectively removing carbon dioxide and hydrogen sulfide from coal gas process streams while leaving carbon monoxide, hydrogen and methane in the stream.

Low-Btu coal gas is produced at lower pressure (about 300 psi) as an alternative fuel for combined-cycle power generation. Removal of hydrogen sulfide from such coal gas streams is essential to minimize atmospheric pollution by sulfur dioxide formed during combustion. Bulk removal of carbon dioxide is neither necessary nor desirable, because expansion of this inert gas in the turbine contributes to its power-generating efficiency. Thus, a process capable of selectively removing hydrogen sulfide from such gas streams while leaving carbon dioxide in the stream is required.

It is therefore an object of this invention to provide a novel, inexpensive, and efficient means for the removal of acid gases such as carbon dioxide and hydrogen sulfide from other gases.

It is a further object of this invention to provide a novel and efficient means of selectively removing hydrogen sulfide from a mixture of hydrogen sulfide and carbon dioxide.

It is a further object of this invention to provide a novel and efficient means of selectively separating carbon dioxide from a mixture of carbon dioxide and hydrogen.

It is a further object of this invention to provide a novel and efficient means of selectively separating hydrogen sulfide and/or carbon dioxide from a mixture containing such gases and methane.

It is a still further object of this invention to provide a novel means of cleaning both coal gas and natural gas.

These and other objects are accomplished by the present invention, which is summarized and particularly described below.

SUMMARY OF THE INVENTION

Figure 1:
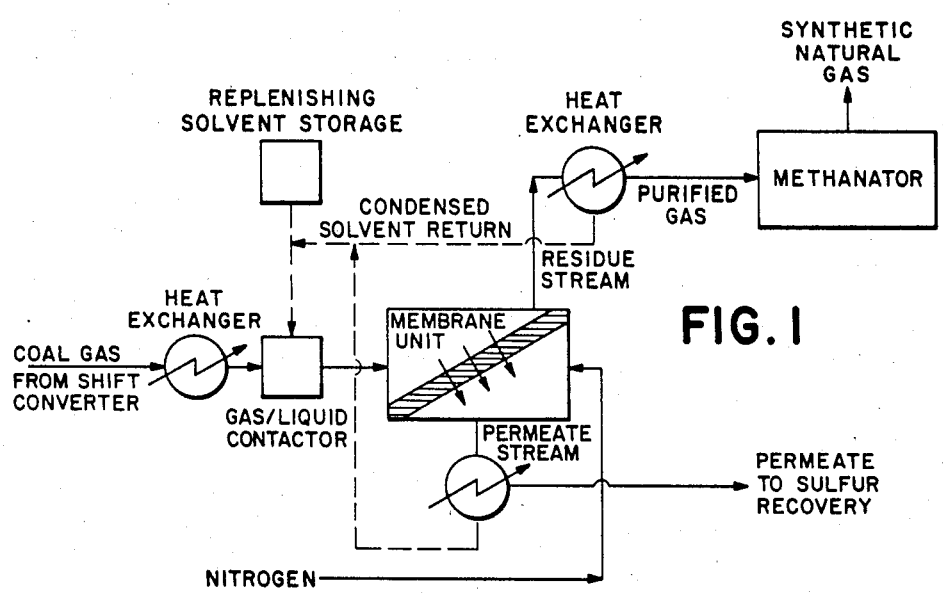
FIG. 1 is a schematic diagram illustrating an exemplary embodiment of the present invention for acid gas removal from high-Btu coal gas.

According to the present invention, novel hybrid membranes are provided that are capable of selective removal of the acid gases carbon dioxide and hydrogen sulfide from other gases and gas mixtures and that are further capable of selective removal of hydrogen sulfide in preference to carbon dioxide and carbon dioxide in preference to hydrogen. The novel hybrid membranes comprise composite immobilized liquid membranes made of polymers that are compatible with and swellable by a class of high boiling point, highly polar solvents containing nitrogen, oxygen, phosphorous or sulfur atoms, the swollen liquid membranes being supported either on or in the pores of other microporous supports. The swellable polymer may be crosslinked before, after, or simultaneously with infusion of the solvent so as to further improve its performance characteristics.

DETAILED DESCRIPTION OF THE INVENTION

There are broadly two aspects to the present invention. One aspect comprises novel composite immobilized liquid membranes and the other aspect comprises methods for the selective removal of the acid gases hydrogen sulfide and carbon dioxide from process streams containing such gases.

The novel composite immobilized liquid membranes of the present invention comprise essentially two components: (1) a solvent-swollen polymer supported upon the surface of or in the pores of (2) a microporous support.

In the aforementioned U.S. Pat. No. 4,737,166, the microporous support was disclosed as being polymeric. It has now been discovered that the microporous support may be other than polymeric, and may include inorganic materials so long as they are sufficiently microporous. In addition, said patent disclosed the principal utility of the composite membranes to be for the separation of acid gases. However, it has now been discovered that the composite membranes of the present invention are also useful in the separation of oxygen and nitrogen.

The solvent-swollen polymer is compatible with and swellable by at least one solvent selected from a class of solvents comprising those solvents with a highly polar group in the molecular structure of the solvent, said highly polar group containing at least one atom selected from nitrogen, oxygen, phosphorous and sulfur, said solvents having a boiling point of at least 100° C. and a solubility parameter of from about 7.5 to about 13.5 $(cal/cm^3\text{-}atm)^{\frac{1}{2}}$. Such solvents may include alcohols, amines, amides, carbamates, carbonates, esters, ethers, lactams, lactones, morpholines, nitriles, phosphates, phosphines, phosphites, pyridines, sulfones, sulfoxides, thiols, thioamides, thioesters, thioethers, thioureas, ureas, and urethanes. Mixtures of such classes of solvents work quite well in the present invention and, in many cases, yield a membrane having performance characteristics superior to those using a single solvent. An especially preferred mixture comprises a mix of alkyl- and aryl-substituted phosphates with alkyl- and aryl-substituted pyrrolidones, e.g., trialkylphosphates and alkylpyrrolidones; a specific example is tri-2-ethylhexylphosphate with N-cyclohexylpyrrolidone. Another preferred mixture of solvents comprises dialkylphthalates and alkyl-substituted pyrrolidones, e.g., dioctylphthalate and N-cyclohexyl-2-pyrrolidone.

A preferred class of such amine solvents includes tertiary amine solvents of the general formula $NR_3$ wherein R is selected from any of alkyl, substituted alkyl, cycloakyl, substituted cycloalkyl, aryl or substituted aryl, the alkyl groups containing from 1 to 20 carbon atoms.

A preferred class of such lactam solvents are the cyclic lactams comprising pyrrolidone-type solvents of the general formula

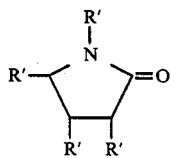

wherein R' is alkyl and substituted alkyl containing from 1 to 20 carbon atoms.

Substituents on the alkyl chains, the cycloalkyl rings and the aryl groups in both the tertiary amine and pyrrolidone formulas generally include nonreactive groups such as hydroxy, amino, halide, and ether groups. Specific examples of preferred tertiary amine solvents with such characteristics include octadecyldimethylamine, tri-N-octylamine, dodecyldimethylamine, tri-n-dodecylamine, tetradecyldimethylamine, hexadecyldimethylamine, and dimethylhydrogenated tallow amine.

Specific examples of preferred pyrrolidone solvents with such characteristics include N-methyl-2-pyrrolidone, N-cyclohexyl-2-pyrrolidone, 5-methyl-N-cyclohexyl-2-pyrrolidone, N-(2-hydroxyethyl)-2-pyrrolidone, N-cocoalkyl-2-pyrrolidone, N-dodecyl-2-pyrrolidone, 1-dimethyl-2-imidazolidone, 1,3-dimethyl-3,4,5,6-tetrahydro-2-(1H)pyrimidone and N-tallowalkyl-2-pyrrolidone.

Specific examples of lactone solvents having the characteristics mentioned above include dodecanolactone, gamma-butyrolactone, delta-valerolactone, alpha-methyl-gamma-butyrolactone, gamma-valerolactone, epsilon-caprolactone, delta-decalactone, 3-methylvalerolactone, 5,5-dimethyl-ene-butyrolactone, and gamma-decalactone.

Specific examples of ester solvents having such characteristics include dimethylmalonate, diethylmalonate, dibutylmalonate, diethylphthalate, dipentylphthalate, dioctylphthalate, diheptylphthalate, dihexylphthalate, ethyllactate, diisodecylphthalate, heptylnonylphthalate, diisodecylfumarate, dinonylglutarate and di-n-butylisosebacate.

Specific examples of carbonate solvents having such characteristics include propylene carbonate, bis(nonylphenyl)carbonate, bis(2-ethoxyethyl)carbonate, diphenylcarbonate, dibutylcarbonate, and 2,3-butylene carbonate.

Specific examples of phosphate solvents having such characteristics include tri(2-ethylhexyl)phosphate, tributylphosphate, dibutylphenylphosphate, isodecyldiphenylphosphate, isopropylphenyldiphenyphosphate, and trinonylphosphate.

Specific examples of phosphite solvents having such characteristics include trimethylphosphite, triethylphosphite, tripropylphosphite, triisoamylphosphite, triphenylphosphite, and trinonylphenylphosphite.

Specific examples of pyridine solvents having such characteristics include 4-(3-pentyl)pyridine, 5-(4-pyridyl)-5-(2-butenyl)-2,7-nonadiene, 4-(5-nonyl)pyridine, and 4-(4'-methylpiperidino)pyridine.

Specific examples of amide solvents having such characteristics include N,N-dimethylformamide, N,N-dimethylacetamide, tetramethyloxamide, N,N-dibutylstearamide, N-ethylacetamide, and N,N-diethylacetamide.

Specific examples of nitrile solvents having such characteristics include valeronitrile, octylnitrile, glutaronitrile, undecylnitrile, dodecylnitrile, malononitrile, adiponitrile, oleylnitrile, benzonitrile, and phenylacetonitrile.

Specific examples of alcohol solvents having such characteristics include sec-butylalcohol, 1-pentanol, heptanol, 1-octanol, 1-dodecanol, cyclohexanol, allylalcohol, benzylalcohol, 2-ethylhexanol, triethyleneglycol, polyethyleneglycol-200, m-cresol, and nonylphenol.

Specific examples of thiol solvents having such characteristics include dodecylthiol, hexadecylthiol, benzylthiol, and butylthiol.

Specific examples of thioether solvents having such characteristics include dihexylsulfide, didecylsulfide, diphenylsulfide, thiophene, and tetrahydrothiophene.

Specific examples of sulfoxide solvents having such characteristics include dimethylsulfoxide and tetramethylenesulfoxide.

Specific examples of sulfone solvents having such characteristics include 2,4-dimethylsulfolane, 3-methylsulfolane, tetrahydrothiophene-1,1-dioxide, methylpropylsulfone, dipropylsulfone, and tolylxylylsulfone.

Specific examples of solvents having such characteristics and containing mixed functional groups include 2-acetylbutyrolactone, 4-[2-(dimethylamino)-ethyl]-morpholine, N,N'-dimethylaminopropyl-pyrrolidone, anethole, 2-ethoxyethylacetate, tributoxyethylphosphate, tetrahydrofurfuryl alcohol, triethanolamine, 2-aminoethanol, 1,1,3,3-tetramethylurea, N-cyclohexyl-p-toluenesulfonamide, and thiomorpholine.

Specific examples of ether solvents having such characteristics include tetraethylene glycol dimethyl ether, polyethylene glycol, polyphenylether and ethylene glycol dibutyl ether.

Specific examples of morpholines having such characteristics include morpholine, 1-morpholino-1cyclohexene, 4-morpholinecarbonitrile and 3-morpholine-1,2-propanediol.

Specific examples of phosphines having such characteristics include trioctylphosphine oxide, triphenylphosphine, and triphenylphosphine dibromide.

Specific examples of thioamides having such characteristics include thioacetamide, thiobenzamide, thioacetanilide and 1,1'-thiocarbonyldiimidazole.

Specific examples of thioesters having such characteristics include gamma-thiobutyrolactone, thiocaprolactam and thioethylacetate.

Specific examples of thioureas having such characteristics include tetramethyl-2-thiourea, 1,1,3,3-tetramethyl-2-thiourea and 2,3-diphenyl-2-thiourea.

Specific examples of ureas having such characteristics include tetramethylurea, tetraethylurea and trimethylurea.

By a polymer "compatible" with the class of solvents noted is meant, generally, a polymer that retains such solvents in a single phase, i.e., the polymer forms a homogeneous mixture with the solvent. Objective tests for determining polymer-solvent compatibility are known in the art. One such test, popularly known as the "blooming" test, comprises mixing the subject polymer and solvent in a volatile solvent such as methylene chloride, tetrahydrofuran or toluene, flashing off the solvent, and observing the mixture to determine whether there is either phase separation or "blooming"—the phenomenon of the solvent in question oozing out of the polymer. If either type of separation does occur, the test is considered to show that the polymer and solvent are not compatible.

By a polymer "swellable" by the class of solvents of the present invention is meant one that can imbibe the solvent in question to the extent that the polymer comprises from about 20 to about 90 wt % of the swollen polymer while at the same time allowing homogeneous distribution thereof throughout the polymer. Under such circumstances the polymer typically swells or increases in volume from about 20% to about 1000%.

Suitable solvent-swellable polymers may be broadly described as slightly polar polymers. Examples of classes of polymers found to be compatible with and swellable by the solvents of the present invention include polymers and compatible copolymers of any of polyvinylpyrrolidones, polymethacrylates, polyamides, polysulfonamides, polysulfones, cellulose acetate, regenerated cellulose, polyurethanes, ethylenevinylacetate copolymers, ethylene-propylene-butadiene terpolymers, polyvinylhalides, and nitrile rubbers. Preferred solvent-swellable polymers are polyvinylpyrrolidones, polysulfonamides, polyurethanes, and polymethacrylates.

Such solvent-swellable polymers may be crosslinked before, after, or simultaneously with infusion by solvent so as to further enhance performance characteristics of the novel composite membranes of the present invention. Exemplary suitable methods of crosslinking include crosslinking by free radical generators such as peroxides (e.g., ammonium peroxydisulfate and dicumyl peroxide) and diazo compounds (e.g., 2,2'-azobis-(isobutyronitrile)) and by other crosslinking agents such as ethylenedimethacrylate, tetraethyleneglycoldimethacrylate, trimethylolmethacrylate, ethoxylated bisphenol-A diacrylate, divinylbenzene, N,N-diallyltartardiamide, triallyl-1,3,5-benzenetricarboxylate, N-N'-methylene bisacrylamide, methyl diisocyanate, toluyl diisocyanate, trimesoyl chloride, and other di- and trifunctional isocyanates, acid halides and vinyl compounds. When crosslinking is accomplished simultaneously with solvent addition, the polymer may even be in its monomeric form, the crosslinking taking place simultaneously with polymerization.

The microporous support of the composite membrane of the present invntion may be generally described as being resistant to attack by the solvents of the present invention, as having surface pores in the range of from about 0.001 to about 10.0 microns in diameter, and as having sufficient tensile strength to withstand transmembrane pressure differentials of at least 100 psi, but preferably 200 to 1500 psi. Suitable candidates include organic polymers such as polyamides, especially the polycondensation product of hexamethylenediamine with adipic acid, or nylon 66, cellulose acetate, crosslinked polysulfone, regenerated cellulose, polyethersulfone, polypropylene, and polytetrafluoroethylene, with thicknesses varying between 20 and 300 microns. Microporous inorganic materials such as porous metals, metal oxides such as silica, alumina or ceramics are also well-suited for use as supports in the present invention. In addition, porous glass, zeolites and virtually any other microporous inorganic material will do. Inorganic materials are particularly suitable as they tend to be quite resistant to attack by the solvents of the gel layer of the present invention. They also tend to have high tensile strengths and therefore can withstand high transmembrane pressures. The support may be in the form of flat sheets or discs or hollow fibers, with the solvent-swollen polymer coating on either the outside or inside (lumens) of the hollow fibers.

The solvent-swollen polymer portion of the composite membranes of the present invention may be supported either directly upon the surface of the microporous polymeric support or within the pores thereof. When the solvent-swollen membrane is on the surface of the support, a particularly preferred form of the solvent-swollen polymer is that of a thin (from about 0.1 to about 20 microns) asymmetric film. By "asymmetric film" is meant a microporous film with a generally nonporous "skin" over the top thereof.

Figure 2:
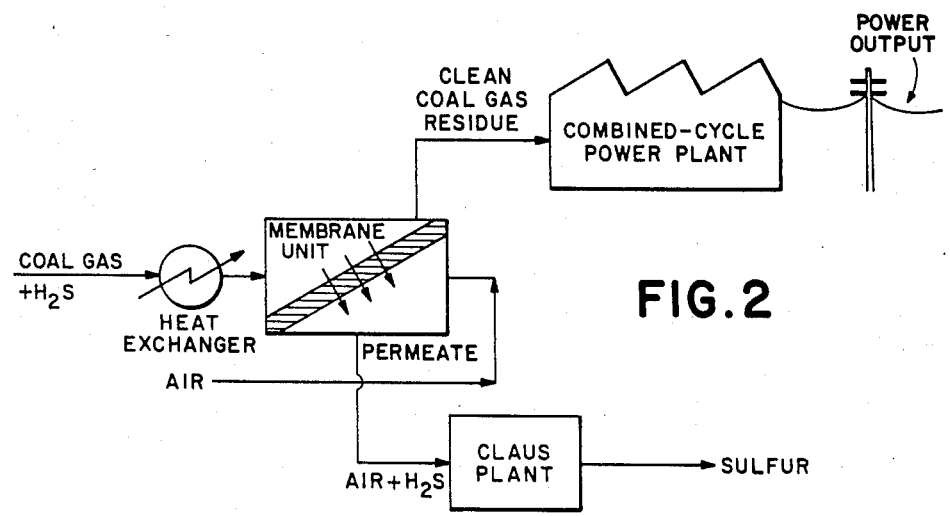
FIG. 2 is a schematic diagram illustrating another exemplary embodiment of the present invention for hydrogen sulfide removal from low-Btu coal gas.

Referring now to the drawings, the removal of acid gases from high-Btu-containing coal gas in a variation of the Synthetic Natural Gas (SNG) process is illustrated in FIG. 1, while FIG. 2 illustrates the removal of hydrogen sulfide from low-Btu-containing coal gas in combination with a Combined-Cycle Power Plant and a Claus Plant.

In the SNG process, the concentration of methane gas from the off gas of coal gasification is enriched in a series of steps to produce a clean, high-Btu-containing gas. The crude gaseous byproduct of coal gasification is a high pressure (on the order of 1000 psi) mixture of steam, hydrogen, carbon monoxide, carbon dioxide, methane and trace quantities of hydrogen sulfide and nitrogen. This mixture is passed through a shift converter where the reaction noted below occurs,

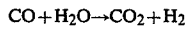

$$CO + H_2O \rightarrow CO_2 + H_2$$

thereby increasing the $H_2/CO$ ratio to about 3:1, as required in the subsequent methanation reaction

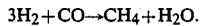

$$3H_2 + CO \rightarrow CH_4 + H_2O.$$

As illustrated in FIG. 1, a hot high-Btu-containing coal gas stream from a shift converter at about 1000 psia is passed through a heat exchanger to cool it to an intermediate temperature, for example, about 30° C. above ambient, and thence through a gas/liquid contactor where the stream is saturated with solvent of the same type with which the membrane of the present invention is swollen. Solvent is provided both from a storage source and from recycled condensed solvent, as explained further below. The so-saturated gas feed stream is directed against the membrane of the present invention at substantially the same pressure it leaves the shift converter (about 800 to 1200 psia). The membrane separation unit may comprise cylindrical modules of spirally-wound flat sheet membranes or longitudinally-oriented hollow fibers. The feed stream comprising $CO_2$, $H_2$, $CH_4$, CO, $N_2$ and $H_2S$ as major components (excluding water vapor) is split by the membrane unit into two streams on either side of the membrane—a permeate stream and a residue stream. In addition to containing solvent vapor from the mebbrane, the permeate stream is rich in concentrations of those gaseous components to which the membrane is more permeable, that is, hydrogen sulfide and carbon dioxide, while the residue stream is rich in concentrations of the remainder of the gaseous components of the feed stream, which includes the hydrocarbon gas $CH_4$ and its mutually reactive components $H_2$ and CO. A sweep stream composed of an inert gas is in constant contact with the permeate side of the membrane to dilute and entrain the permeate gases and separate them from the process system. Pressure of approximately 1 atm on the permeate side of the membrane is preferably maintained, and preferably at least 100 psi less than on the feed stream side. In connection with the SNG process, the inert gas is preferably nitrogen inasmuch as that gas is generally available as an off gas from an air separation unit (not shown) that provides oxygen to the coal gas gasifier. Each of the permeate and residue streams may be cooled in heat exchangers whereby the solvent vapor in the streams is condensed and thereafter returned to the gas/liquid contactor for recycling.

As illustrated in FIG. 2, a low-Btu-containing coal gas stream at about 300 psia, useful in a Combined Cycle Power Plant is similarly cooled to an intermediate temperature in a heat exchanger, the stream being split by a membrane separator into a permeate stream relatively rich in $H_2S$ and a residue stream containing the remainder of the gaseous components and being relatively rich in $CO_2$. In this case, the permeate sweep stream may comprise air, which entrains the $H_2S$ and advantageously helps oxidize $H_2S$ to elemental sulfur in a Claus plant. Pressure on the permeate side of the membrane is maintained at least 100 psi lower than that on the feed side, and preferably on the order of 14 to 20 psia. Relatively clean (<0.1% $H_2S$) coal gas remains in the residue stream, which is useful as a fuel in a Combined-Cycle Power plant.

EXAMPLE 1

A solution was prepared comprising 5.46 g of N-vinyl-2-pyrrolidone (the monomeric precursor of polyvinylpyrrolidone), 1.24 g of isodecylmethacrylate (a co-monomer to N-vinyl-2-pyrrolidone), 0.15 g polyvinylpyrrolidone (PVP), 1.15 g of ethoxylated Bisphenol-A-diacrylate (a crosslinking agent), 0.1 g of dicumyl peroxide (a polymerization initiator), 0.1 g of 2,2-dimethoxy-2-phenylacetophenone (an activator for hhe polymerization initiator), and 2.0 g N-methyl-2-pyrrolidone (NMP). A thin film (approximately 50 microns) of this solution was cast onto a glass plate and irradiated with ultraviolet light for one minute, causing partial polymerization of the NMP-swollen polymer, whereupon it was contacted with a microporous polymeric support of nylon 66 approximately 125 microns in thickness sold under the trade name Ultipor NDG and made by Pall Corporation of Glen Cove, N.Y. After contact with the support, polymerization was completed by ultraviolet radiation for another six minutes. The support membrane was removed from the glass plate, carrying the NMP-swollen PVP crosslinked polymer with it and containing 20% by weight NMP.

EXAMPLE 2

An anisotropic microporous polymeric support membrane of cellulose acetate (CA) manufactured by Gracesep Mfg. Ltd. of Bend, Oregon was partially hydrolyzed by cutting it into 4×10-inch strips and placing them in a vessel containing a solution of 2.0 wt % triethylamine in water. The solution was constantly agitated during the hydrolysis reaction for six hours. The partially hydrolyzed strips were removed from the solution and rinsed in running water for two hours. Water was then removed from them by solvent exchange with first isopropanol and then hexane for 20 minutes each, followed by air drying.

The compatibility of a polyurethane polymer made by Hexcel Corp. of Chatsworth, Calif. and sold under the name Uralite 6115 with the solvent N-cyclohexyl2-pyrrolidone was verified by allowing the polymer to imbibe up to 400 wt % of the solvent with no phase separation or loss of solvent, the polymer swelling in volume approximately 750%.

The CA support prepared as outlined above was then coated with a solvent-swollen crosslinked polyurethane gel prepared as follows: 20 wt % of the monomeric precursor components of Uralite 6115 containing an initiator, a catalyst, and a methyl-diisocyanate crosslinking agent was mixed with 80 wt % N-cyclohexyl-2-pyrrolidone and placed in an oven at 100° C. for six hours.

The resulting partially-gelled crosslinked polymeric mixture was diluted to about 35 wt % with toluene and sprayed onto the cellulose acetate support with an air brush to a thickness of about 15 microns. The socoated support was covered with aluminum foil and left at room temperature for 24 hours before use.

EXAMPLES 3-6

The gas permeation properties of the composite gel-coated membrane of Example 2 were studied with respect to carbon dioxide, hydrogen, hydrogen sulfide and methane. Discs of the membrane 47 mm in diameter were placed in Millipore ® high-pressure filter holders and the coated side exposed to 100 psig of each of the gases except hydrogen sulfide, which was at 10 psig, and the flow of gas measured after five minutes of such exposure. The flux (reported in units of SCFH/ft²-10,000 psi) and selectivity (ratio of fluxes) for each membrane is shown in Table I below.

TABLE I

| Ex. No. | Flux | | | | Selectivity | | | |
|---|---|---|---|---|---|---|---|---|
| | $CO_2$ | $H_2$ | $H_2S$ | $CH_4$ | $CO_2/H_2$ | $H_2S/CO_2$ | $H_2S/CH_4$ | $CO_2/CH_4$ |
| 3 | 116 | 13.8 | 695 | 4.5 | 8.4 | 6.0 | 153 | 25.8 |
| 4 | 91 | 7.9 | 821 | 5.6 | 11.6 | 9.0 | 146 | 16.3 |
| 5 | 87 | 5.9 | 721 | 5.1 | 14.7 | 8.3 | 140 | 17.1 |
| 6 | 125 | 23.3 | 909 | 9.8 | 5.4 | 7.3 | 92 | 12.8 |

As is apparent from the above data, the composite membranes of the present invention showed high selectivity toward carbon dioxide over hydrogen, hydrogen sulfide over carbon dioxide, hydrogen sulfide over methane and carbon dioxide over methane, thus making them excellent candidates for acid gas scrubbing applications.

EXAMPLE 7

A simulated study was conducted for 98% removal of $H_2S$ and 93% removal of $CO_2$ from a high-Btu-containing coal gas feed stream from a shift converter at 1000 psia and 20° C. and having the volumetric composition noted in Table II (omitting water vapor). The feed stream in the study was split into a permeate and a residue stream by a series of spiral-wound modules containing the solvent-swollen membrane of Example 2 and having a combined surface area of $1.89 \times 10^6$ ft². Pressure on the permeate side of the membrane was maintained at 20 psia. The results are shown in Table II.

TABLE II

| | Composition (vol %) | | |
|---|---|---|---|
| Component | Feed | Purified Coal Gas | Permeating Gases* |
| $H_2S$ | 0.5 | <0.01 | >0.49 |
| $CO_2$ | 33.3 | 2.4 | 78.0 |
| $H_2$ | 32.2 | 48.5 | 9.0 |
| CO | 10.1 | 15.5 | 2.5 |
| $CH_4$ | 23.1 | 32.0 | 10.4 |
| $N_2$ | 0.8 | 1.5 | 0.8 |
| Total | 100 | 100 | 100 |
| Flow Rate* ($10^6$ SCFD) | 670.5 | 395.5 | 275 |

*The $N_2$ sweep stream flow rate of $308.6 \times 10^6$ SCFD adds to the total flow rate of the permeate.

EXAMPLE 8

A simulated study was conducted for 92% removal of $H_2S$ from a low-Btu-containing coal gas feed stream at 300 psia and 20° C. and having the volumetric composition noted in Table III (omitting water vapor). The feed stream in the study was split into a permeate and a residue stream by the same type of membrane modules as in Example 7 having a combined surface area of $2.57 \times 10^4$ ft². Pressure on the permeate side of the membrane was maintained at 20 psia. The results are shown in Table III.

TABLE III

| | Composition (vol %) | | |
|---|---|---|---|
| Component | Feed | Purified Coal Gas | Permeating Gases |
| $H_2S$ | 1 | 0.086 | 14.4 |
| $CO_2$ | 15 | 11 | 73.7 |
| $H_2$ | 22 | 23 | 4.41 |
| CO | 19 | 20 | 3.4 |
| $CH_4$ | 5 | 5 | 1.6 |
| $N_2$ | 38 | 41 | 2.5 |
| Total | 100 | 100 | 100 |
| Flow Rate ($10^6$ SCFD) | 250 | 233 | 17 |

EXAMPLES 9-13

Other highly permeable and acid-gas selective composite gel-coated membranes were prepared in the same manner as in Example 2 using the solvents noted in Table IV, except that the CA support membrane was not partially hydrolized (an unnecessary step in these examples that is otherwise performed to improve the resistance of the CA support membrane toward swelling by certain solvents, such as N-cyclohexyl-2-pyrrolidone (NCHP)).

The gas permeation properties of the composite gel-coated membranes were studied using the methods described in Examples 3-6. The results are shown in Table IV below.

TABLE IV

| Ex. No. | Solvent | Flux | | | | Selectivity | | | |
|---|---|---|---|---|---|---|---|---|---|
| | | $CO_2$ | $H_2$ | $H_2S$ | $CH_4$ | $CO_2/H_2$ | $H_2S/CO_2$ | $H_2S/CH_4$ | $CO_2/CH_4$ |
| 9 | dipentyl-phthalate | 480 | — | 1180 | 10.7 | — | 2.5 | 110 | 44.9 |
| 10 | 4-(4'methyl-piperidino)-pyridine | 340 | 350 | 3090 | 8.8 | 0.97 | 9.1 | 350 | 39 |
| 11 | anethole | 270 | — | — | 7.5 | — | — | — | 36 |
| 12 | diethyl-phthalate | 360 | — | — | 10.4 | — | — | — | 34.6 |
| 13 | N—dodecyl- | 270 | 250 | 990 | 7.0 | 1.1 | 3.7 | 140 | 39 |

TABLE IV-continued

| Ex. | | Flux | | | | Selectivity | | | |
|---|---|---|---|---|---|---|---|---|---|
| No. | Solvent | $CO_2$ | $H_2$ | $H_2S$ | $CH_4$ | $CO_2/H_2$ | $H_2S/CO_2$ | $H_2S/CH_4$ | $CO_2/CH_4$ |
| | pyrrolidone | | | | | | | | |

EXAMPLE 14

Figure 3:
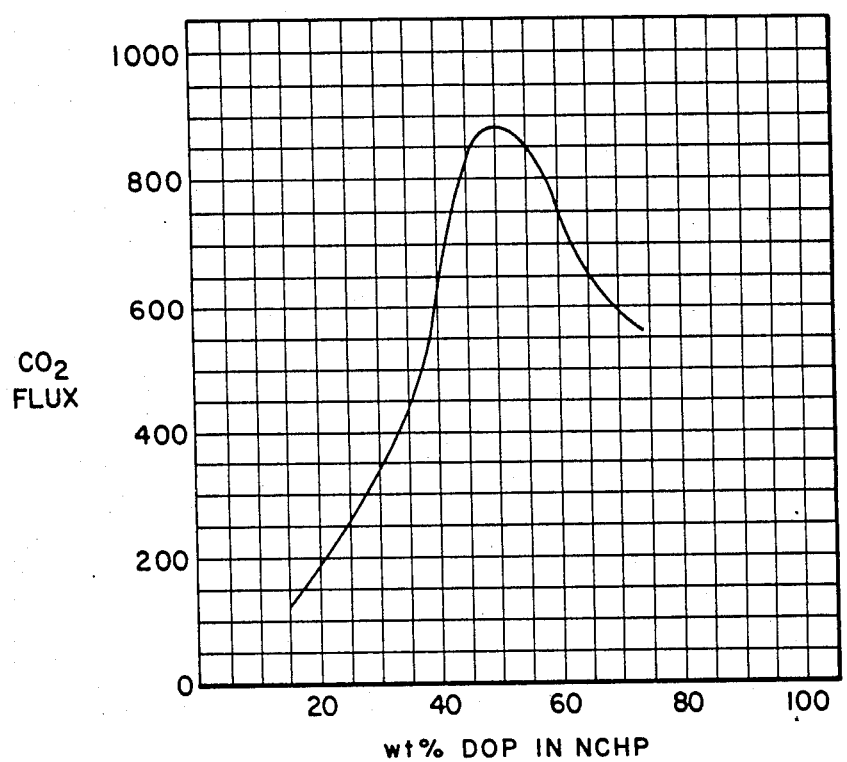
FIG. 3 is a graph showing a relationship between the composition of a membrane of the present invention and flux of one acid gas therethrough.

For specific separations, membrane properties may be optimized in terms of permeate flux and selectivity by using suitable swelling solvent mixtures in the gel-composite membrane. Membranes were prepared and tested as described in Examples 9–13 using swelling-solvent mixtures of from 20 wt % to 75 wt % dioctylphthalate (DOP) in NCHP. The results are shown in FIG. 3 with flux reported in the same units as in Examples 3–6. As seen in FIG. 3, the optimum DOP/NCHP solvent ratio for a high $CO_2$-flux gel-membrane is 1:1. The high $CO_2$-flux gel-membrane also gave a high $CO_2/CH_4$ separation factor of 27, making it a very useful membrane for separating carbon dioxide from methane gas streams.

EXAMPLE 15

A membrane was prepared and tested as described in Examples 9–13, using a swelling solvent mixture of 75 wt % tri-2-ethylhexylphosphate (TEHP) in NCHP. This membrane exhibited high fluxes for $CO_2$ and $H_2S$ (850 and 3,250 SCFH/ft²-10,000 psi, respectively), while maintaining high $CO_2/CH_4$ and $H_2S/CH_4$ separation factors of 30 and 125, respectively.

Example 16

Solvent-swollen gel membranes were prepared by first mixing 2 g of an ethylene-vinyl acetate copolymer resin that had 25 wt % vinyl acetate content and 6 ml NCHP in 20 ml of toluene until a homogeneous polymer solution was obtained. A 4-mil layer of solution was then cast on a glass plate using a doctor blade. The plate was allowed to stand at room temperature for 90 minutes to allow evaporation of the toluene and coagulation of the polymer/NCHP into a rubbery gel film about 1.1 mil thick. The gel film was removed from the glass plate and placed on the surface of a microporous cellulose acetate support membrane of the type described in Example 2.

The gas-permeation properties of the so-prepared composite gel-cellulose acetate membrane was measured for carbon dioxide, nitrogen, and hydrogen. Discs of the membrane 47 mm in diameter were placed in a Millipore ® high-pressure filter holder, the gel side was exposed to 114 psia carbon dioxide, 914 psia nitrogen, and 64 psia hydrogen, and the flow of gas was measured after 20 minutes of such exposure.

The pressure-normalized gas fluxes for the membrane reported in the same units as in Examples 3–6 were 3900 for carbon dioxide, 430 for hydrogen, and 480 for nitrogen; selectivities were 9.0 for $CO_2/H_2$ and 81 for $CO_2/N_2$. Estimated selectivities for $H_2S/CO_2$ and $H_2S/CH_4$ were $\geq 5$ and $\geq 25$, respectively.

EXAMPLES 17–18

Two composite immobilized liquid membranes prepared in substantially the same manner as in Example 2 were made by coating two microporous alumina discs 47 mm in diameter (Anotec Separations Ltd., Banbury, England), having a nominal pore size of 0.02 micron in diameter, with a solvent-swollen crosslinked polyurethane gel by first preparing a mixture of 20 wt % Uralite 6115, containing an initiator, a catalyst, and a methyl-diisocyanate crosslinking agent and 80 wt % N-cychlohexyl-2-pyrrolidone. The mixture was placed in an oven at 100° C. for six hours. The resulting partially-gelled mixture was then diluted to about 20% with toluene. The microporous alumina disc was affixed to a glass plate using adhesive tape and the plate and disc were dipped into the diluted gel mixture and then withdrawn. The so-coated disc, having a coating approximately 40 microns thick, was covered with aluminum foil and left at room temperature for 24 hours before use.

The gas permeation properties of the two composite membranes described above were studied for both $CO_2/CH_4$ and $O_2/N_2$ separations using the methods described in Examples 3–6. The results are shown in Table V.

TABLE V

| Example | Flux | | | | Selectivity | |
|---|---|---|---|---|---|---|
| No. | $CO_2$ | $CH_4$ | $O_2$ | $H_2$ | $CO_2/CH_4$ | $O_2/N_2$ |
| 17 | 64 | 13 | 8 | 1.8 | 4.9 | 4.4 |
| 18 | 66 | 6.7 | 8 | 3.6 | 9.8 | 2.2 |

EXAMPLES 19–21

Three additional composite gel membranes similar to those of Examples 17–18 were prepared by (1) laying a solvent-swollen gel film on a microporous sintered steel disc (Examples 19–20) and (2) by laying a second essentially identical film on a porous glass disc (Example 21) (Pyrex ® fine glass frit made by Corning Glass) having a nominal pore size of 4–8 microns in diameter. Gel films were fabricated by coating a glass plate with a 0.075-inch-thick solution of either 50 wt % Uralite 6115 and 50 wt % N-cyclohexyl-2-pyrrolidone or 20 wt % Uralite 6115 and 80% N-cyclohexylpyrrolidone that had been cured at 100° C. and then diluted with toluene as described in Examples 17–18. The film was allowed to stand at room temperature for 24 hours during which time the toluene evaporated and the solution formed an N-cyclohexylpyrrolidone-swollen crosslinked urethane gel film. The resulting rubbery film was about 0.015 to 0.025 inch thick. The film was transferred from the glass to the surface of the porous glass or porous metal support discs. The gas premeation properties of the resulting composite membranes were tested for both $CO_2/CH_4$ and $O_2/N_2$ separation using the methods described in Examples 3–6. The results are shown in Table VI.

TABLE VI

| Example No. | Film Thickness (inch) | Concentration Solvent (wt %) | Flux | | | | Selectivity | |
|---|---|---|---|---|---|---|---|---|
| | | | CO$_2$ | CH$_4$ | O$_2$ | N$_2$ | CO$_2$/CH$_4$ | O$_2$/N$_2$ |
| 19 | 0.015 | 80 | 24 | 4.5 | 15.5 | 3.7 | 5.4 | 4.2 |
| 20 | 0.025 | 50 | 2.9 | 0.5 | 0.20 | 0.06 | 5.7 | 3.2 |
| 21 | 0.025 | 50 | 1.35 | 0.135 | — | — | 10.0 | — |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A composite immobilized liquid membrane characterized in that it comprises:
   (a) a microporous support; and
   (b) a solvent-swollen polymer compatible with and swellable by at least one solvent selected from a class of solvents comprising those solvents with a highly polar group in the molecular structure of the solvent, said highly polar group containing at least one atom selected from nitrogen, oxygen, phosphorous and sulfur, said solvents having a boiling point of at least 100° C. and a solubility parameter of from about 7.5 to about 13.5 (cal/cm$^3$-atm)$^{\frac{1}{2}}$.

2. The membrane of claim 1 wherein the solvent is selected from alcohols, amines, amides, carbamates, carbonates, esters, ethers, lactams, lactones, morpholines, nitriles, phosphates, phosphines, phosphites, pyridines, sulfones, sulfoxides, thiols, thioamides, thioesters, thioethers, thioureas, ureas, urethanes and mixtures thereof.

3. The membrane of claim 1 wherein the solvent is a solvent of the formula NR$_3$ or

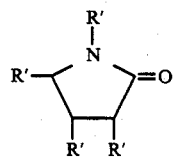

wherein R is alkyl and substituted alkyl containing from 1 to 20 carbon atoms, cycloalkyl, substituted cycloalkyl, aryl and substituted aryl, R' is alkyl and substituted alkyl containing from 1 to 20 carbon atoms, the substituents in both R and R' groups being selected from the group consisting essentially of hydroxy, amino, halides and ethers.

4. The membrane of claim 1 wherein said solvent-swollen polymer has 20% to 95% by weight of said solvent homogeneously distributed therethrough.

5. The membrane of claim 1 wherein said solvent-swollen polymer is contaned with in the pores of said microporous support.

6. The membrane of claim 1 wherein said solvent-swollen polymer is in the form of a thin film on the surface of said microporous support.

7. The membrane of claim 1 wherein said solvent-swollen polymer is selected from polyvinylpyrrolidones, polysulfonamides, polyureas, polyurethanes, polyacrylates, polymethacrylates, polyesters, polyamides, polysulfones, cellulose acetates, regenerated celluloses, ethylene-vinylacetate copolymers, ethylene propylene-butadiene terpolymers, polyvinylhalides, nitrile rubbers, and copolymers and mixtures thereof.

8. The membrane of claim 1 wherein said solvent is selected from mixtures of (a) alkyl- and aryl-substituted phosphates and (b) alkyl- and aryl-substituted pyrrolidones.

9. The membrane of claim 8 wherein said alkyl- and aryl-substituted phosphate is selected from trialkyl- and triaryl-substituted phosphates.

10. The membrane of claim 9 wherein said solvent comprises a mixture of tri-2-ethylhexylphosphate and N-cyclohexylpyrrolidone.

11. The membrane of claim 1 wherein said solvent is selected from N-methyl-2-pyrrolidone, N-cyclohexyl-2-pyrrolidone, N-dodecyl-2-pyrrolidone, N-(2-hydroxyethyl)-2-pyrrolidone, N-cocoalkyl-2-pyrrolidone and N-tallowalkyl-2-pyrrolidone.

12. The membrane of claim 1 wherein said microporous support is a porous inorganic material selected from alumina, silica, metal, metal oxides, ceramics and zeolites.

13. The membrane of claim 1 wherein said solvent-swollen polymer is selected from polyvinylpyrrolidone and polyurethane and said solvent is selected from N-methyl-2-pyrrolidone, N-cyclohexyl-2-pyrrolidone diethylphthalate, dipentylphthalate, 4-(4'-methylpiperidino)pyridine, anethole, N-dodecylpyrrolidone, mixtures of dioctylphthalate and N-cyclohexyl-2-pyrrolidone, and mixtures of tri-2-ethylhexyl-phosphate and N-cyclohexyl-2-pyrrolidone.

14. The membrane of claim 1 wherein said solvent-swollen polymer is an ethylene-vinyl acetate copolymer and said solvent is N-cyclohexyl-2-pyrrolidone.

15. The membrane of claim 1 wherein said solvent-swollen polymer is crosslinked by a crosslinking agent selected from peroxides, diazos, vinyls, acid halides, and isocyanates.

16. The membrane of claim 15 wherein crosslinking of said crosslinked solvent-swollen polymer is accomplished by the use of a crosslinking agent selected from ethylenedimethacrylate, tetraethyleneglycoldimethacrylate, trimethylolmethacrylate, ethoxylated Bisphenol-A diacrylate, divinylbenzene, N,N-diallyltartardiamide, triallyl-1,3,5-benzenetricarboxylate, N-N'-methylene bisacrylamide, methyl-diisocyanate, toluyl diisocyanate and trimesoylchloride.

17. The membrane of claim 15 wherein said solvent-swollen polymer is polyvinylpyrrolidone and crosslinking is accomplished simultaneously with polymerization of a monomeric precursor of polyvinylpyrrolidone.

18. A method for the separation of hydrogen sulfide and carbon dioxide gases from hydrogen, carbon monoxide and hydrocarbon gases comprising splitting a feed stream comprising all of said gases with the membrane of any of claims 1, 7, 8, 11, 13, 14, or 15 or 16 into a permeate stream on one side of said membrane rich in hydrogen sulfide and carbon dioxide and a residue stream on the other stream side of said membrane rich in the remainder of said gases.

19. The method of claim 18 wherein the partial pressures of hydrogen sulfide and carbon dioxide on the permeate stream side of said membrane are less than the partial pressures of such gases on the feed stream side of said membrane.

20. The method of claim 18, additionally comprising a sweep gas stream on the permeate side of said membrane.

21. The method of claim 20 wherein said sweep gas comprises air.

22. The method of claim 20 wherein said sweep gas stream comprises an inert gas.

23. The method of claim 22 wherein said inert gas comprises nitrogen.

24. The method of claim 18, additionally comprising saturating either or both of said feed stream and said sweep stream with the same solvent with which said membrane has been swollen.

25. The method of claim 24 wherein said saturating solvent is recovered from either or both of said permeate stream and said residue stream and is recycled to either or both of said feed stream and said sweep stream.

26. The method of claim 25 wherein said recovery is by condensation of solvent vapor in said permeate and residue streams.

27. The method of claim 26 wherein said condensation is accomplished by means of a heat exchanger.

28. A method for the separation of hydrogen sulfide gas from carbon dioxide gas comprising splitting a feed stream comprising both of said gases with the membrane of claim 1, 7, 8, 11, 13, 14 or 15 into a hydrogen sulfide-rich permeate stream and a carbon dioxide-rich residue stream.

29. The method of claim 28 wherein the partial pressures of hydrogen sulfide and carbon dioxide on the permeate stream side of said membrane are less than the partial pressures of such gases on the feed stream side of said membrane.

30. The method of claim 28, additionally comprising a sweep gas stream on the permeate side of said membrane.

31. The method of claim 30 wherein said sweep gas comprises air.

32. The method of claim 30 wherein said sweep gas comprises an inert gas.

33. The method of claim 32 wherein said inert gas comprises nitrogen.

34. The method of claim 30, additionally comprising saturating either or both of said feed stream and said sweep stream with the same solvent with which said membrane has been swollen.

35. The method of claim 34 wherein said saturating solvent is recovered from either or both of said permeate stream and said residue stream and is recycled to either or both of said feed stream and said sweep stream.

36. The method of claim 35 wherein said recovery is by condensation of solvent vapor in said permeate and residue streams.

37. The method of claim 36 wherein said condensation is accomplished by means of a heat exchanger.

38. A method for the separation of oxygen gas from nitrogen gas comprising splitting a feed stream comprising both of said gases with the membrane of claim 1, 7, 8, 11, 13, 14, or 15 into an oxygen-rich permeate stream and a nitrogen-rich residue stream.

39. The method of claim 38 wherein the partial pressure of oxygen on the permeate side of said membrane is less than the partial pressure of oxygen on the feed side of said membrane.

40. The method of claim 38, additionally comprising saturating said feed stream with the same solvent with which said membrane has been swollen.

41. The method of claim 40 wherein said saturating solvent is recovered from either or both of said permeate stream and said residue stream and is recycled to said feed stream.

42. The method of claim 41 wherein said recovery is by condensation of solvent vapor in said permeate and residue streams.

43. The method of claim 42 wherein said condensation is accomplished by means of a heat exchanger.

* * * * *

UNITED STATES PATENT AND TRADEMARK OFFICE
CERTIFICATE OF CORRECTION

PATENT NO. : 4,824,443
DATED : April 25, 1989
INVENTOR(S) : Stephen L. Matson, et al.

It is certified that error appears in the above-identified patent and that said Letters Patent is hereby corrected as shown below:

| | | |
|---|---|---|
| Col. 1, | Line 54: | Change "ess" to --less--. |
| Col. 5, | Line 15: | Change "functionalgroups" to --functional groups--. |
| Col. 6, | Line 35: | Change "invntion" to --invention--. |
| Col. 7, | Line 47: | Change "mebbrane" to --membrane--. |
| Col. 8, | Line 26: | Change "hhe" to --the--. |
| Col. 9, | Line 4: | Change "socoated" to --so-coated--. |
| Col. 13, | Line 60: | Change "contaned" to --contained--. |
| Col. 14, | Line 68: | Change "14, or 15" to --14, 15--. |

Signed and Sealed this

Thirtieth Day of July, 1991

Attest:

HARRY F. MANBECK, JR.

*Attesting Officer*

*Commissioner of Patents and Trademarks*